United States Patent
Yokoyama

[19]
[11] Patent Number: 6,067,172
[45] Date of Patent: *May 23, 2000

[54] TERMINAL COUPLED TO INTEGRATED SERVICES DIGITAL NETWORK HAVING CONFIRMATION CALL OPERATION

[75] Inventor: Koji Yokoyama, Sagamihara, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,609

[22] Filed: Jun. 13, 1996

[30] Foreign Application Priority Data

Jun. 15, 1995 [JP] Japan .................................. 7-148463
Jun. 5, 1996 [JP] Japan .................................. 8-142691

[51] Int. Cl.[7] .............................. H04N 1/00; H04N 1/32
[52] U.S. Cl. ............................................ 358/442; 358/434
[58] Field of Search ............................. 358/442, 434, 358/435, 444, 468, 404, 524, 400, 405, 406; 379/100.01, 100.14, 100.15, 100.12

[56] References Cited

U.S. PATENT DOCUMENTS

| 4,746,986 | 5/1988 | Tanigawa | 358/442 |
|---|---|---|---|
| 4,961,185 | 10/1990 | Sawada | 370/79 |
| 5,142,568 | 8/1992 | Ogata et al. | 358/442 |
| 5,204,895 | 4/1993 | Yoshiura | 358/442 |
| 5,341,377 | 8/1994 | Ohtani | 370/110.1 |
| 5,418,625 | 5/1995 | Shimoosawa | 358/442 |
| 5,481,605 | 1/1996 | Sakurai et al. | 379/243 |

FOREIGN PATENT DOCUMENTS

1-198163  8/1989  Japan .

Primary Examiner—Madeleine Nguyen
Attorney, Agent, or Firm—Oblon, Spivak, McClelland, Maier & Neustadt, P.C.

[57] ABSTRACT

A terminal, such as a group 4 (G4) facsimile, coupled to an integrated services digital network has a function for setting up a confirmation call for automatically detecting a change of a different terminal, from a group 3 (G3) facsimile to a G4 facsimile. The G4 facsimile has a memory for memorizing information of a different terminal, such as, for example, a calling number, a short formed calling number under an abbreviated dialing mode, and a corresponding identification whether the different terminal conforms to a G3 or G4 facsimile procedure. The G4 facsimile sets up a confirmation call under the G4 facsimile procedure to confirm whether or not the different terminal has been updated to a G4 facsimile, only at a time of when the different terminal is identified as being conformable to the G3 facsimile procedure by the identification, and, optionally, when an arbitrary time period, which is memorized in the calling G4 facsimile, is exceeded. Upon succeeding in connecting to the different terminal by the confirmation call, the G4 facsimile carries on data transmission until completing the call process, and also updates the identification.

18 Claims, 10 Drawing Sheets

TERMINAL COUPLED TO INTEGRATED SERVICES DIGITAL NETWORK HAVING CONFIRMATION CALL OPERATION

BACKGROUND OF THE INVENTION

1. Field of the Invention

This invention relates to a terminal coupled to an integrated services digital network (ISDN), and more particularly to a terminal coupled to the ISDN having a operation for executing a confirmation call for detecting a change in a destination terminal of a communication procedure from a group III (G3) facsimile procedure to a group IV (G4) facsimile procedure.

2. Discussion of the Background

A public switched telephone network (PSTN) is not suitable for transmitting digital data, such as, digital voice data for communications, digital image data for a facsimile, digital video image data, and so forth. Since a demand for such digital data is rapidly increasing, another data transmission network, namely an integrated services digital network (ISDN), is designed to handle digital data and to replace the PSTN. For the time being, however, until the PSTN is completely replaced by the ISDN, the ISDN and the PSTN are provided to allow two terminals, which have the same communication procedure and which are respectively coupled to the different networks, to exchange data with each other. However, one terminal which is coupled to the ISDN and transmits and receives image data under a communication procedure conforming to a group 4 (G4) facsimile procedure prescribed by CCITT (Comite Consultif International Telegraphique et Telephonique) recommendations, such as, a G4 facsimile, for example, can not exchange image data with another terminal when the another terminal is coupled to the PSTN and transmits and receives image data under a communication procedure conforming to a group III (G3) facsimile procedure prescribed by CCITT recommendations, such as, a G3 facsimile.

In this circumstance, most G4 terminals additionally include a function of a G3 facsimile procedure to have an internetworking function. At the same time, the G4 facsimile terminal, for example, requires a function for discriminating whether a different terminal to be called is a G4 facsimile coupled to the ISDN or a G3 facsimile coupled to the PSTN. Several proposals responding to such a demand are disclosed in the official gazette for Laid Patent Applications TOKUKAI SHO 63-8664, TOKUKAI HEI 2-21758, and so forth, for example.

Generally, the G4 facsimile also includes a memory for storing information of different terminals to be called, such as, for example, a calling number, a short formed calling number to be used in an abbreviated dialing mode (ADM), a corresponding identification for identifying whether the different terminal to be called conforms to the G3 facsimile procedure or the G4 facsimile procedure, and the like, to facilitate a process of setting up a call.

However, the identification to be memorized, as described above, does not always correctly represent the communication procedure to which the corresponding different terminal to be called conforms. The reason is that an operator may not know what communication procedure the corresponding different terminal to be called actually conforms to at a time when the operator inputs the identification into a memory of the calling terminal at the operator's site. Also, an operator may not know when a different terminal to be called has been changed to a G4 facsimile after the operator has correctly input an identification of the different terminal to be called as a G3 facsimile machine. Thus, a discrepancy is created between a memorized identification and an actually available communication procedure, and cases with and without such a discrepancy are explained below.

In a first case, a discrepancy is created such that an identification in the memory of a calling G4 facsimile incorrectly indicates that a different terminal to be called conforms to the G4 facsimile procedure, despite the fact that the different terminal to be called is coupled to the PSTN and conforms only to the G3 facsimile procedure. In this case, when the G4 facsimile sets up a call to the different terminal using, for example, a short formed calling number memorized in the memory of the G4 facsimile, the call is set up under the G4 facsimile procedure in accordance with the memorized identification. As a result, the calling G4 facsimile fails in connecting to the called different terminal. However, upon a detection of the failure, the calling G4 facsimile immediately changes its communication procedure from the G4 facsimile procedure to the G3 facsimile procedure and sets up another call under the G3 facsimile procedure. Then, the calling G4 facsimile succeeds in connecting to and transmitting data to the called different terminal with the G3 procedure. After that, the calling G4 facsimile automatically changes the identification in its memory to indicate that the called different terminal conforms to the G3 facsimile procedure; this updated identification is then used for setting up future calls.

In a second case, a stored identification indicates that a different terminal to be called conforms to the G4 facsimile procedure, and the different terminal to be called actually conforms to both the G3 facsimile procedure and the G4 facsimile procedure. In this case, the G4 facsimile sets up a call under the G4 facsimile procedure in accordance with the stored identification, and there is no problem in connecting to and transmitting data to the called different terminal smoothly by the G4 procedure.

In a third case, a stored identification indicates that a different terminal to be called conforms to the G3 facsimile procedure, and the different terminal to be called actually conforms only to the G3 facsimile procedure. In this case, the G4 facsimile sets up a call under the G3 facsimile procedure in accordance with the identification and has no problem in connecting to and transmitting data to the called different terminal smoothly. Once the G4 facsimile sets up a call in the above-mentioned first case, the first case turns into this third case because the G4 facsimile changes its stored identification to indicate that the called different terminal conforms to the G3 facsimile procedure and the discrepancy is dismissed as described in reference to the first case.

In a fourth case, a stored identification indicates that a different terminal to be called conforms to the G3 facsimile procedure, and the different terminal to be called conforms to both the G3 facsimile procedure and the G4 facsimile procedure. In this case, the G4 facsimile sets up a call under the G3 facsimile procedure in accordance with the stored identification. As a result, the calling G4 facsimile succeeds in connecting to and transmitting data to the called different terminal under the G3 facsimile procedure, despite the fact that the called different terminal also conforms to the G4 facsimile procedure.

From the above cases, it is evident that a G4 facsimile is capable of automatically switching its communication procedure from the G4 facsimile procedure to the G3 facsimile procedure when it detects that the different terminal to be called does not conform to the G4 facsimile procedure, since communication does not take place with the G4 procedure.

Further, in the fourth case, since communication does take place in the G3 procedure, the G4 facsimile does not switch to the G4 facsimile procedure from the G3 facsimile procedure during setting up a call even when the different terminal to be called conforms to the G4 facsimile procedure.

However, a situation may arise in which a different terminal conforming only to the G3 facsimile procedure in the above-mentioned first case and third case is replaced or updated by another different terminal conforming to both the G4 facsimile procedure and the G3 facsimile procedure at a time in the future, and then, the case becomes the same as the above-mentioned fourth case in which a calling G4 facsimile does not switch its communication procedure during setting up a call from the G3 facsimile procedure to the G4 facsimile procedure, even through the called different terminal conforms to the G4 facsimile procedure.

Further, each time when an operator for the G4 facsimile is notified by any means that a communication procedure of the different terminal is changed from the G3 facsimile procedure to the G4 facsimile procedure, the operator needs to manually change a corresponding identification in the memory to indicate that the different terminal conforms to the G4 facsimile procedure.

A cause for this inconvenience on a G4 facsimile is, simply, that the G4 facsimile is not structured to detect whether or not the different terminal to be called conforms to the G4 facsimile procedure, once a communication with the G3 procedure is established with the called different terminal, despite the fact that the called different terminal has been updated to conform also to the G4 facsimile procedure.

SUMMARY OF THE INVENTION

Accordingly, an object of the present invention is to provide a novel group IV (G4) facsimile system which sets up a confirmation call for automatically detecting a change on a different terminal to be called from a group III (G3) facsimile to a G4 facsimile.

In order to achieve the object of the present invention, a terminal apparatus of the present invention can transmit and receive image data. The terminal apparatus includes a memory for memorizing a number of a facsimile terminal to be called and an indication of a facsimile procedure of the called facsimile machine; that is, whether the called facsimile machine is a G3 or a G4 facsimile terminal. Furthermore, according to the present invention, an operation can be implemented to execute a confirmation call under a G4 facsimile procedure to the called facsimile terminal when the memory indicates that the called facsimile terminal has a G3 facsimile procedure. The time for executing the confirmation call can be set by an operator or can be set by a default operation of the terminal apparatus in the present invention.

With such an operation in the present invention, if the confirmation call is successful under the G4 facsimile procedure, this indicates that the called facsimile terminal has been replaced or updated from a G3 facsimile terminal to a G4 facsimile terminal. The memory of the terminal apparatus of the present invention can then be updated to record that the called terminal has now been updated to a G4 facsimile terminal. Future communication can then take place under the G4 facsimile procedure.

This operation of the present invention updates a status when a called facsimile terminal has been replaced or updated from a G3 facsimile machine to a G4 facsimile machine. This allows the terminal apparatus of the present invention to take advantage of the benefits of the G4 facsimile transmission procedure for future communication.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
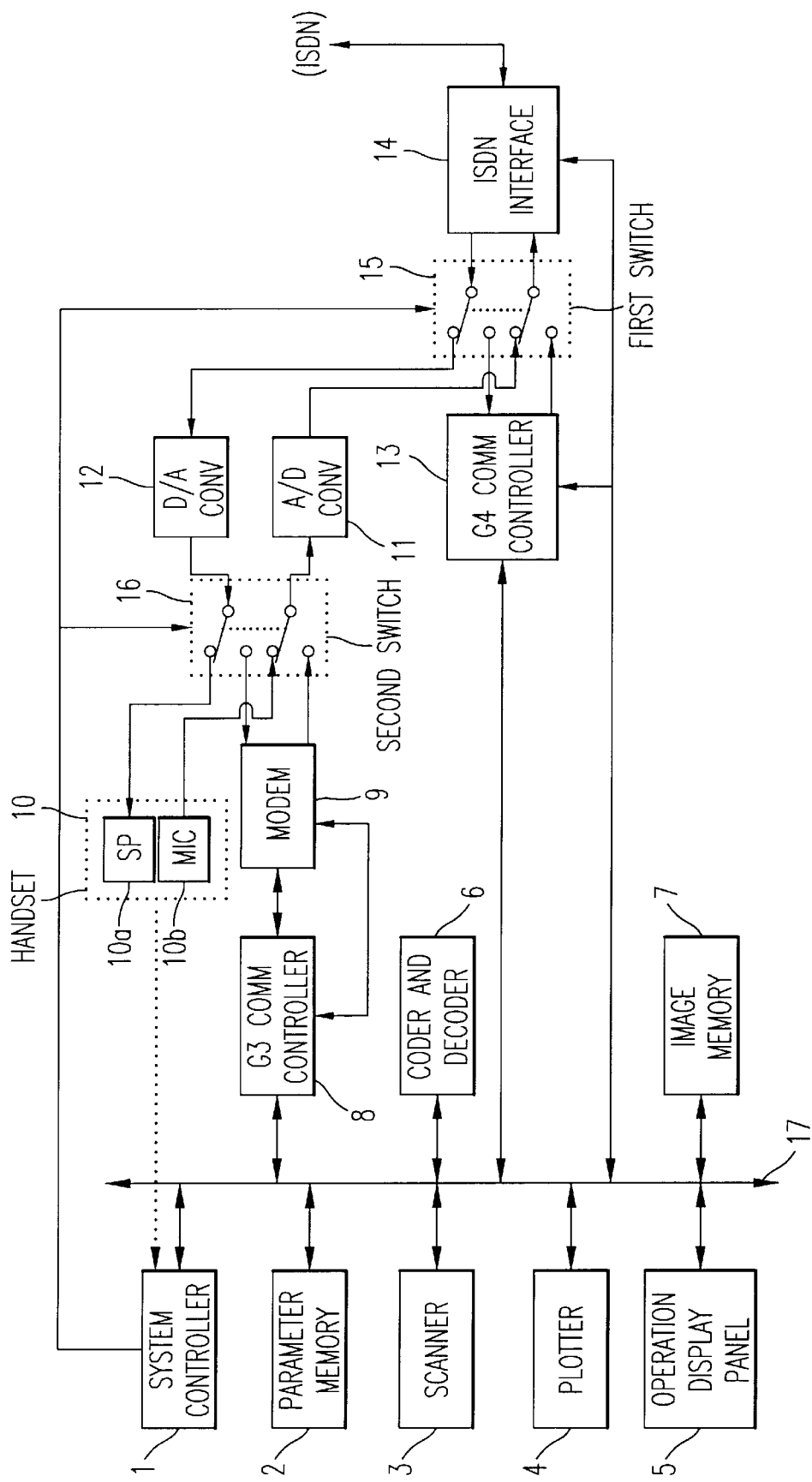
FIG. 1 is a block diagram illustrating an exemplary structure of a facsimile apparatus which can implement the feature of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a schematic block diagram of a facsimile which may embody the present invention. The facsimile in FIG. 1 is provided with a group IV (G4) facsimile function, a group III (G3) facsimile function, and a telephone set function.

The facsimile 1 includes a system control 1 having a built-in timer and so forth, for controlling an entire system of the facsimile. A parameter memory 2 memorizes various information, specific to the facsimile, for example, information related to an abbreviated dialing mode (ADM) including a corresponding communication procedure whether a G3 facsimile procedure or a G4 facsimile procedure is to be executed, information on a calling fee, and the like. A scanner 3 reads an original document to be sent at a predetermined resolution and a plotter 4 outputs an image at a predetermined resolution on a recording medium. An operation display panel 5 inputs numeric information and instructions and displays messages and so forth.

Further, a coder and decoder (codec) 6 compresses an image signal by coding and decompressing compressed image data by decoding to generate the original image signal, and is capable of performing an encoding function in a predetermined method specified to both a G3 facsimile and a G4 facsimile. An image memory 7 memorizes image data compressed by the codec 6. A G3 communication control unit 8 controls a data transmission according to a G3 facsimile procedure. A modem (modulator and demodulator) 9 modulates digital data and demodulates modulated digital data. A handset 10 serves as a communication tool, and includes a speaker 10a and a microphone 10b.

An analog to digital (A/D) converter 11 converts an analog signal supplied from the modem 9 or the microphone 10b to a digital signal suitable to be transmitted through an integrated services digital network (ISDN). A digital to analog (D/A) converter 12 converts a digital signal received through the ISDN to a corresponding analog signal. A G4 communication control unit 13 controls a data transmission according to a G4 facsimile procedure. An ISDN interface circuit 14 performs an ISDN line control related up to layer 3 of an ISDN structured architecture, which is explained later.

Moreover, a first switch 15 switches between two connections, of which a first connection connects a local device side of the ISDN interface circuit 14 to the A/D converter 11 and the D/A converter 12, and a second connection which connects the local device side of the ISDN interface circuit 14 to the G4 communication control unit 13. A second switch 16 switches between two connections, of which a first connection connects an analog connecting side of the A/D converter 11 and the D/A converter 12 to the modem 9, and a second connection which connects the analog connecting side of the A/D converter 11 and the D/A converter 12 to the handset 10. A system bus 17 is provided for transmitting data.

As is well known, a layer structure of an OSI (open systems interconnection) includes 7 layers, or an ISDN structured architecture as recommended by CCITT, and the above-mentioned layer 3 is a part of it. Layer 1 is a physical layer, layer 2 is a data link layer, and layer 3 is a network layer. Layer 4 is a transport layer, layer 5 is a session layer, layer 6 is a presentation layer, and layer 7 is an application layer.

The system bus 17 connects lines for transmitting various data back and forth among the system control 1, the parameter memory 2, the scanner 3, the plotter 4, the operation display panel 5, the codec 6, the image memory 7, the G3 communication control 8, and the G4 communication control 13. The ISDN interface circuit 14 communicates with the system control 1 and the G4 communication control 13 to exchange various information.

The switch 15 is normally set at a connection in which the ISDN interface circuit 14 is connected to the G4 communication control 13, and switches from the above-mentioned connection to the other connection in which the ISDN interface circuit 14 is connected to the A/D converter 11 and the D/A converter 12 when the other terminal being connected to is judged as a G3 facsimile. In this way, a transmission mode of the facsimile is changed from a G4 facsimile mode to a G3 facsimile mode, or to a telephone mode in which the handset 10 is used.

On the other hand, the switch 16 is normally set at a connection in such a way that the A/D converter 11 and the D/A converter 12 are connected to the handset 10, and that a hook switch (not shown) provided to the handset 10 turns into an off-hook state when the handset 10 is lifted by an operator. A signal indicative of a state of the hook switch is applied to the system control 1 through a signal line indicated by a broken line in FIG. 1. When the handset 10 is switched to the off-hook state, the system control 1 controls the facsimile to operate in a speech mode. In the speech mode, the switch 15 is controlled so as to select the connection in which the ISDN interface circuit 14 is connected to the A/D converter 11 and the D/A converter 12. On the other hand, when the system control 1 activates the G3 communication control 8 to provide a G3 facsimile function, the system control 1 controls the switch 16 to switch the connection from the handset 10 to the modem 9.

Figure 2:
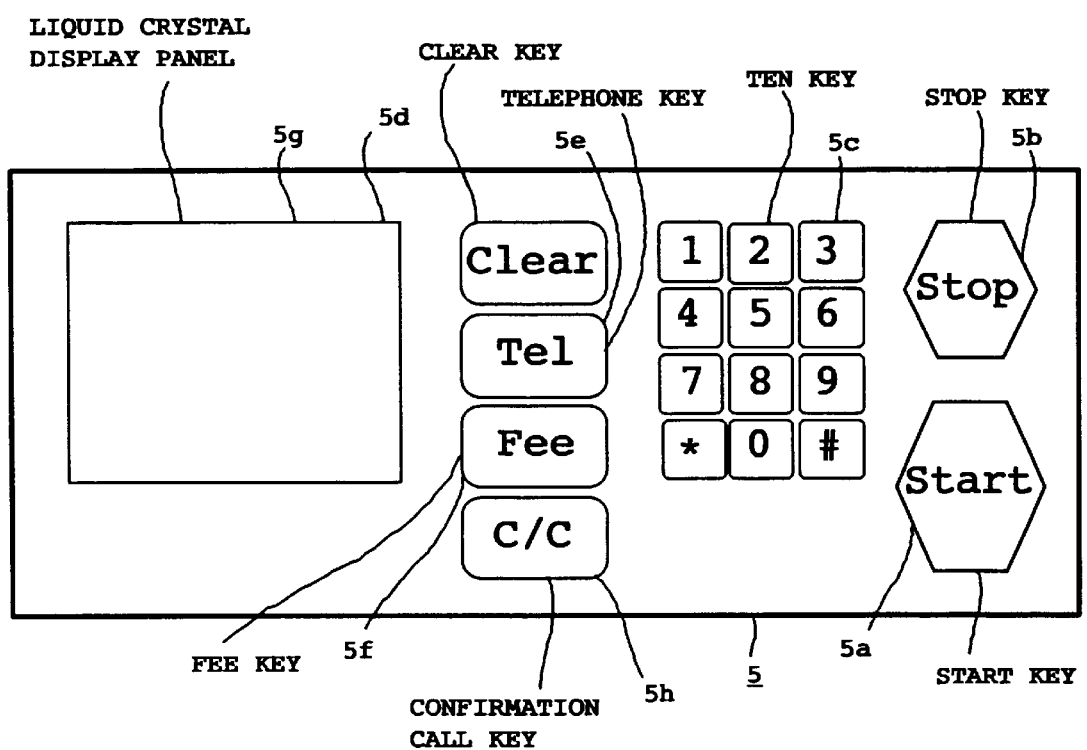
FIG. 2 is an exemplary layout of various keys and a liquid crystal display (LCD) panel mounted on an operation display panel.

FIG. 2 illustrates an example of an operational side of the operation display panel 5, where various keys and a liquid crystal display (LCD) panel 5g are provided. In FIG. 2, a start key 5a is used for starting a transmission operation and a receiving operation of the facsimile. A stop key 5b is used for stopping an operation of the facsimile. A ten-key pad 5c is used for inputting numeric information, such as, for example, a telephone number, a short formed telephone number to be used in an abbreviated dialing mode (ADM), and so forth. The ten-key pad 5c has a plurality of modes, such as, a telephone number input mode, a numeric data input mode, and a date input mode. A clear key 5d is used for canceling input information. A telephone key 5e is used for setting an input mode of the ten-key pad 5c to a telephone number input mode. A fee key 5f is used for instructing a start of fee displaying. An optional confirmation call key 5h may also be provided for setting up a confirming call for a selected facsimile machine to be called, which is memorized as a G3 facsimile as is described in further detail below. A liquid crystal display (LCD) panel 5g displays, for example, an operational guidance message to an operator supplied from the facsimile, various information such as a fee for usage, and the like, and an instructive screen where the operator is allowed to input numeric information when the above-mentioned confirmation call key 5h is depressed.

Figure 3A:
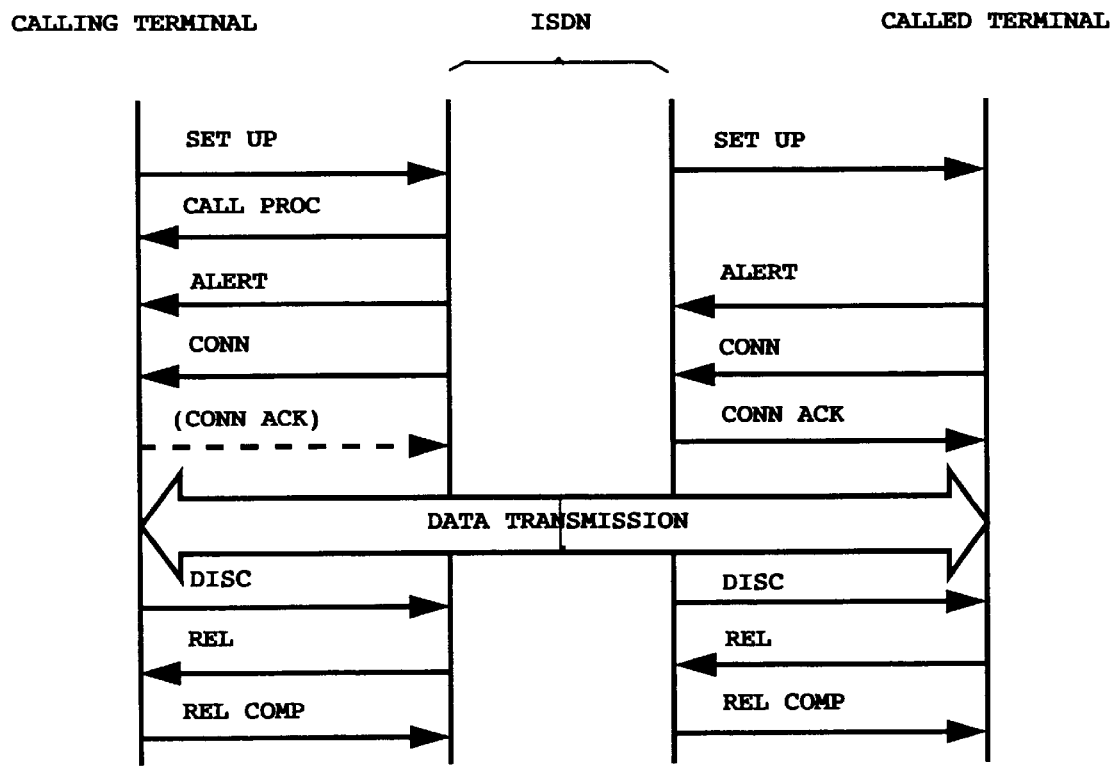
FIGS. 3(a) and 3(b) are sequence charts showing message correspondence based on a basic transmission control procedure in an integrated services digital network (ISDN)

Next, a basic data transmission procedure of an ISDN terminal is explained with respect to FIGS. 3(*a*) and 3(*b*). A terminal, which is a calling terminal, sends a call setup message SETUP to an ISDN for requesting a call setup to another terminal, which is a called terminal. Upon a receipt of the call setup message SETUP, the ISDN sends the call setup message SETUP to the designated called terminal for setting up a call between the calling terminal and the called terminal. Further, the ISDN sends a call setup procurement message CALL-PROC to the calling terminal for notifying a call setup procurement state. The called terminal starts ringing to alert an operator upon detection of receiving the call setup message SETUP and sends an alerting message ALERT to the ISDN for notifying of alerting. Then, the ISDN sends to the calling terminal the alerting message ALERT for notifying the calling terminal of alerting by the called terminal. Further, the called terminal sends a connection message CONN to the ISDN for notifying of a call acceptance. The ISDN, then, sends the connection message CONN to the calling terminal for notifying of the call acceptance by the called terminal.

Upon receiving the connection message CONN, the calling terminal sends a connection acknowledgment message CONN-ACK to the ISDN for notifying of a connection acknowledgment by the calling terminal. Then, the ISDN sends the connection acknowledgment message CONN-ACK to the called terminal for notifying of the connection acknowledgment by the called terminal. At this time, as a result, an information channel for data transmission is established between the calling terminal and the called terminal. Thereby, the two terminals are allowed to communicate with each other. After that, data transmission is carried out between the calling terminal and the called terminal in accordance with respective data transmission control procedures. For example, data transmission based on the G4 facsimile procedure is executed.

Upon a completion of data transmission, the calling and called terminals start a disconnection procedure. The calling terminal first sends a disconnection message DISC to the ISDN for requesting an information channel release. Consequently, the ISDN sends the disconnecting message DISC to the called terminal for notifying of the information channel release. Then, the called terminal sends a release message REL to the ISDN for notifying a completion of a disconnection, and the ISDN sends the release message REL to the calling terminal. Upon completing the information channel release, the calling terminal sends a release completion message REL-COMP to the ISDN for notifying of a completion of the information channel release, and then the ISDN sends the release completion message REL-COMP to the called terminal for notifying of a completion of the information channel release. Thereby, the release of the information channel is completed. And thus, the information channel established between the calling and called terminals is completely released from the connection state, and the line returns to the idle state.

Figure 3B:
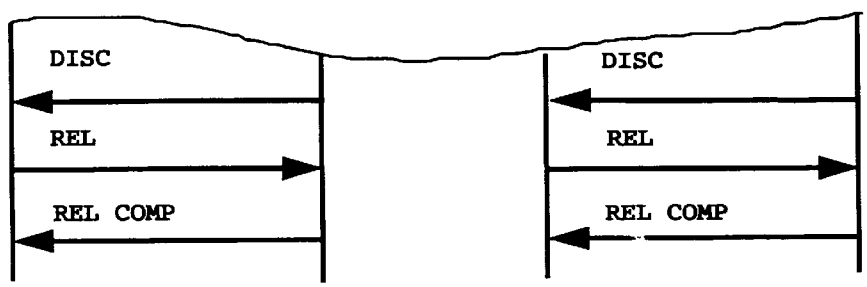

In this manner, the information channel is established between the calling and called terminals, and is then released from the connection state. Alternatively, it is possible for the called terminal to send the disconnection message DISC to thereby request a release of the information channel from the connection state. In this case, the messages illustrated in FIG. 3(b) are sent.

When the information channel is released from the connection state in the above-mentioned procedure, the ISDN includes information of a calling charge in the release message REL to send to the calling terminal in the case that the disconnection message DISC is transmitted from the calling terminal. Alternatively, the ISDN includes information of a calling charge in the release message PEL to send to the calling terminal in the case that the disconnection message DISC is transmitted from the called terminal.

Figure 4:
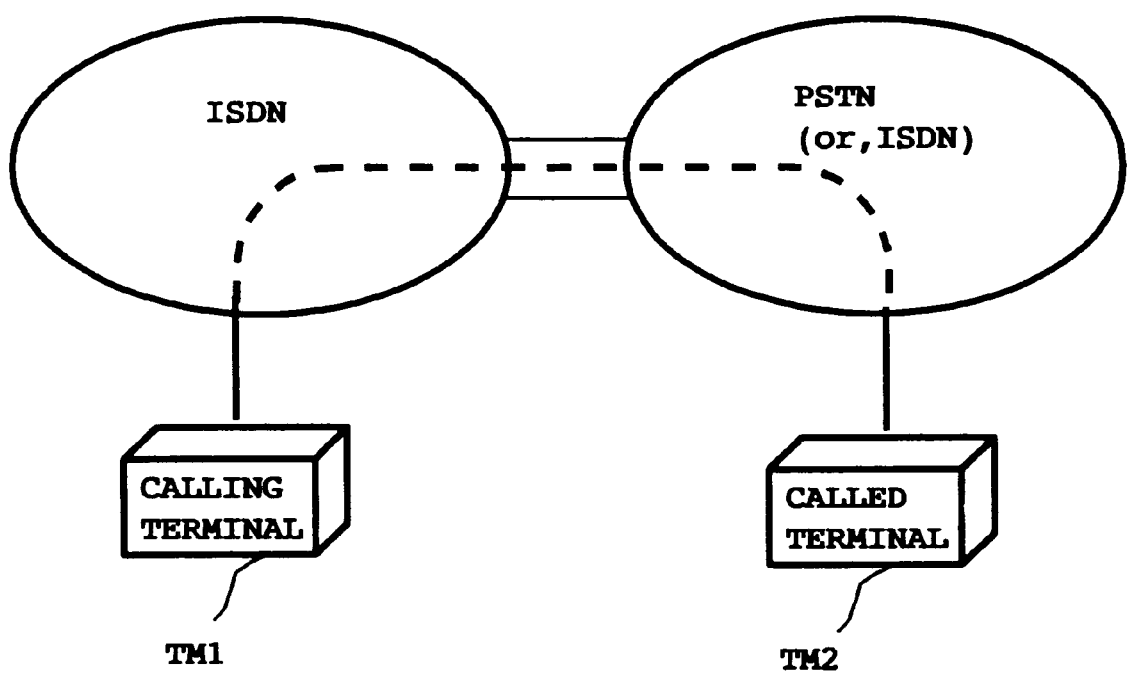
FIG. 4 is an illustration showing an example of an internetworking between an ISDN and a public switched telephone network (PSTN)

Next, a case that a terminal coupled to an ISDN sets up a call to a different terminal, which conforms only to a communication procedure for analog data, such as the G3 facsimile procedure, and can be coupled to the ISDN by either a public switched telephone network (PSTN) or, as shown in parenthesis, by the ISDN, is explained with respect to FIG. 4. When a terminal, TM1, which is a calling terminal, sets up a call to the above-mentioned different terminal, TM2, which is a called terminal, the ISDN calls the designated different terminal with an internetworking function. Thereby, an information channel is established between TM1 coupled to the ISDN and TM2 coupled to the PSTN. In this case, if the function of TM1 and TM2 coincide with each other, these two terminals can communicate with each other. At this time, the ISDN notifies TM1 that TM2 is a non-ISDN terminal by adding a progress identifier to various messages used for setting up a call, that is, the call proceeding message CALL PROC, the alerting message ALERT, the connection message CONN, and a progress indication message PROG.

Next, the above-mentioned messages in conformity to layer 3 for setting up a call and disconnecting a line are explained with respect to FIGS. 5(a)–5(e).

Figure 5A:
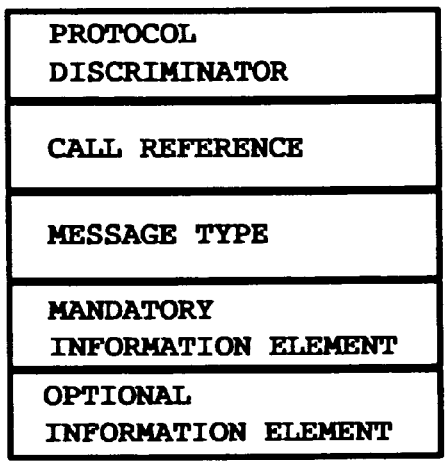
FIGS. 5(a)–5(e) are illustrations showing a basic structure of a message and information elements included in various messages.

As shown in FIG. 5(a), each message includes: a protocol discriminator for specifying a protocol specification, such as, for example, a data format, an information sequence, and so forth, which defines a call control message for layer 3; a call reference for specifying a call corresponding to the present message; a message type for identifying contents of the message; a mandatory information element which is added to each message without exception; and an optional information element which is added to each message on an as needed basis. The number of the mandatory information element is 0, 1, or a plural number in accordance with a type of messages, and the number of the optional information element is 0, 1, or a plural number in accordance with the present situation.

Figure 5B:
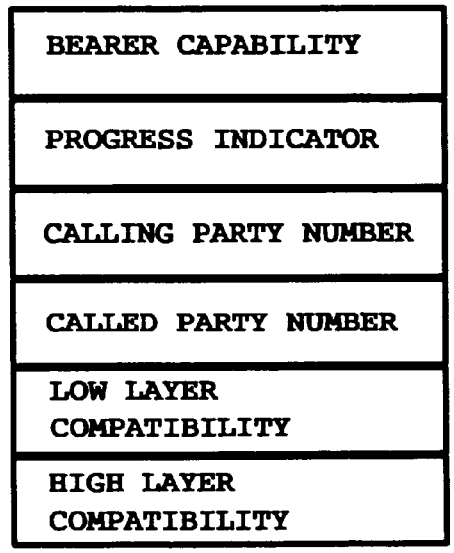
Figure 5C:
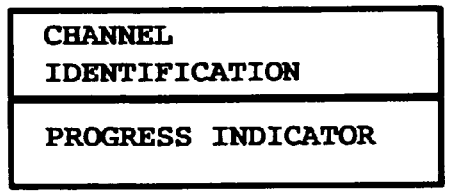
Figure 5D:
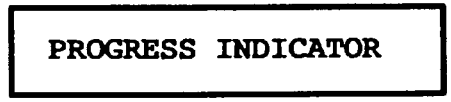
Figure 5E:
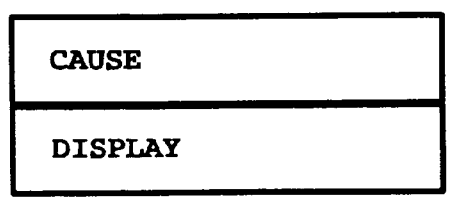

The call setup message SETUP includes, as shown in FIG. 5(b), a mandatory information element such as a bearer capability, and optional information elements, such as, for example, a progress indicator, a calling party number, a called party number, a low layer compatibility, a high layer compatibility, and so forth. The call proceeding message CALL PROC includes, as shown in FIG. 5(c), optional information elements, such as, for example, a channel identification, a progress indicator, and so forth. As shown in FIG. 5(d), each of the call message and the answer message includes the progress indicator, as an optional information element. The progress indication message PROG includes, which is not shown in the drawings, mandatory information elements, such as, for example, a cause, and so forth. And, each of the disconnecting message DISC and the release message REL include, as shown in FIG. 5(e), a mandatory information message such as a cause, and optional information elements, such as, for example, display, and so forth.

Next, an outline of each information element is explained. A bearer capability information element includes various information, such as, for example, an information transmission capability which indicates whether the information to transmit is made of a voice, non-limited digital information, limited digital information, 3.1 KHz audio, 7 Khz audio, or a video, a data transmission mode which indicates whether the exchange to be used for data transmission is a line exchange or a packet exchange, an information transmission rate which indicates an information transmission speed, information which indicates a data transmission style and a protocol of user information, and so forth. A progress indicator information element indicates an event, which occurs during a call process, such that a call is not an ISDN end-to-end call, a called terminal is a non-ISDN data terminal, a calling terminal is a non-ISDN data terminal. A calling party number information element indicates an ISDN address (number) of the calling terminal, and a called party number information element indicates the ISDN address of the called terminal.

The low layer compatibility information element is used for checking a communication compatibility with a called terminal, and includes information basically identical to that of the bearer capability information element. Additionally, the low layer compatibility information element includes further detailed information which are not shown in the drawings. The high layer compatibility information element is used for checking a compatibility of communication with a called terminal, and indicating an available terminal function, such as, for example, a group II (G2) or G3 facsimile function, a G4 facsimile function, a mixed mode function, a teletex function, a videotex function, a telex function, or a message handling system function. The channel identification information element is used for specifying a channel or a sub-channel used in a basic interface of an ISDN. The cause information element is used for describing a reason why a message is generated, a diagnosis message used when there is an error in the procedure, and a source which generates the reason. The display information element is used for displaying information required to be displayed on a terminal, such as, for example, a call charge, and so forth.

It is noted that the system controller 1, shown in FIG. 1, of the calling terminal detects and determines that the called terminal is coupled to a network such as, for example, a PSTN rather than an ISDN, based on the information of the progress indication from the ISDN, when this progress indication is included in at least one of the call proceeding message COLL PROC, the alerting message ALERT, and connection message CONN, all of which are sent from the ISDN, and/or when the progress indication is included in the progress indication message PROG from the ISDN. On the other hand, the called terminal detects that the called terminal is coupled to a network such as, for example, a PSTN rather than an ISDN, based on the information of the progress indication received from the ISDN, when this progress indication is included in the call setup message SETUP sent from the ISDN, and when receiving the progress indication message sent from the ISDN.

Further, when the call setup message SETUP includes the low layer compatibility information element and the high layer compatibility information element, the called terminal can judge whether the calling terminal has the same function as itself from the contents of the above compatibility information elements. Therefore, the called terminal can determine whether the call from the calling terminal should be accepted or not from the results. In the above-mentioned manner, the calling and called terminals can detect the available functions of the respective other terminals, before starting data transmission. Thereby, a data transmission procedure to be used is suitably switched.

Next, a procedure of selecting a transmission function of the facsimile, shown in FIG. 1, during a call process is explained with respect to FIGS. 6(a)–6(d). In Step 101 in FIG. 6(a), the system controller 1 of the calling terminal controls the ISDN interface circuit 14 so as to send the ISDN the call setup message SETUP. Then, the system controller 1 of the calling terminal checks whether or not the call proceeding massage CALL PROC from the ISDN is received within a predetermined time period by a NO judgment loop in Steps 102 and 103. When judgment of Step 102 becomes YES upon a receipt of the call proceeding message CALL PROC, the system controller 1 of the calling terminal checks, by Step 104, whether or not the progress indication information element is included in the call proceeding message CALL PROC. When the judgment of Step 104 becomes NO in a case that the progress indication information element is not included in the call proceeding message CALL PROC, the system controller 1 of the calling terminal checks, by a NO judgment loop in Steps 105 and 106, whether or not the alerting message ALERT from the ISDN is received within a predetermined time period after the receipt of the call proceeding message CALL PROC. When the judgment of Step 105 becomes YES upon a receipt of the alerting message ALERT, the system controller 1 of the calling terminal checks, by Step 107, whether or not the progress indication is included in the alerting message ALERT. When the judgment of Step 107 becomes NO, the system controller 1 of the calling terminal checks, by a NO judgment loop in Steps 108, 109, and 110, whether or not the connection message CONN or the progress indication message PROG is received within a predetermined time period after the receipt of the alerting message ALERT.

When the judgment of Step 108 becomes YES upon a receipt of the connection message CONN, the system controller 1 of the calling terminal checks, by Step 111, whether or not the progress indication is included in the connection message CONN. When the judgment of Step 111 becomes NO, the system controller 1 of the calling terminal recognizes that the called terminal is coupled to an ISDN, and consequently, instructs the G4 communication controller 13 to start the G4 facsimile transmission control procedure by Step 112.

When a judgment of Step 109 becomes YES upon a receipt of the progress indication message PROG, the system controller 1 of the calling terminal checks, by Step 113, whether or not the progress indication is included in the progress indication message PROG. In a case that the judgment of Step 113 becomes NO, the system controller 1 of the calling terminal recognizes that the contents of the progress indication message PROG are in an abnormal state. For this reason, the system controller 1 of the calling terminal instructs the ISDN interface circuit 14 to immediately release the information channel from the used state by Step 114.

Figure 6A:
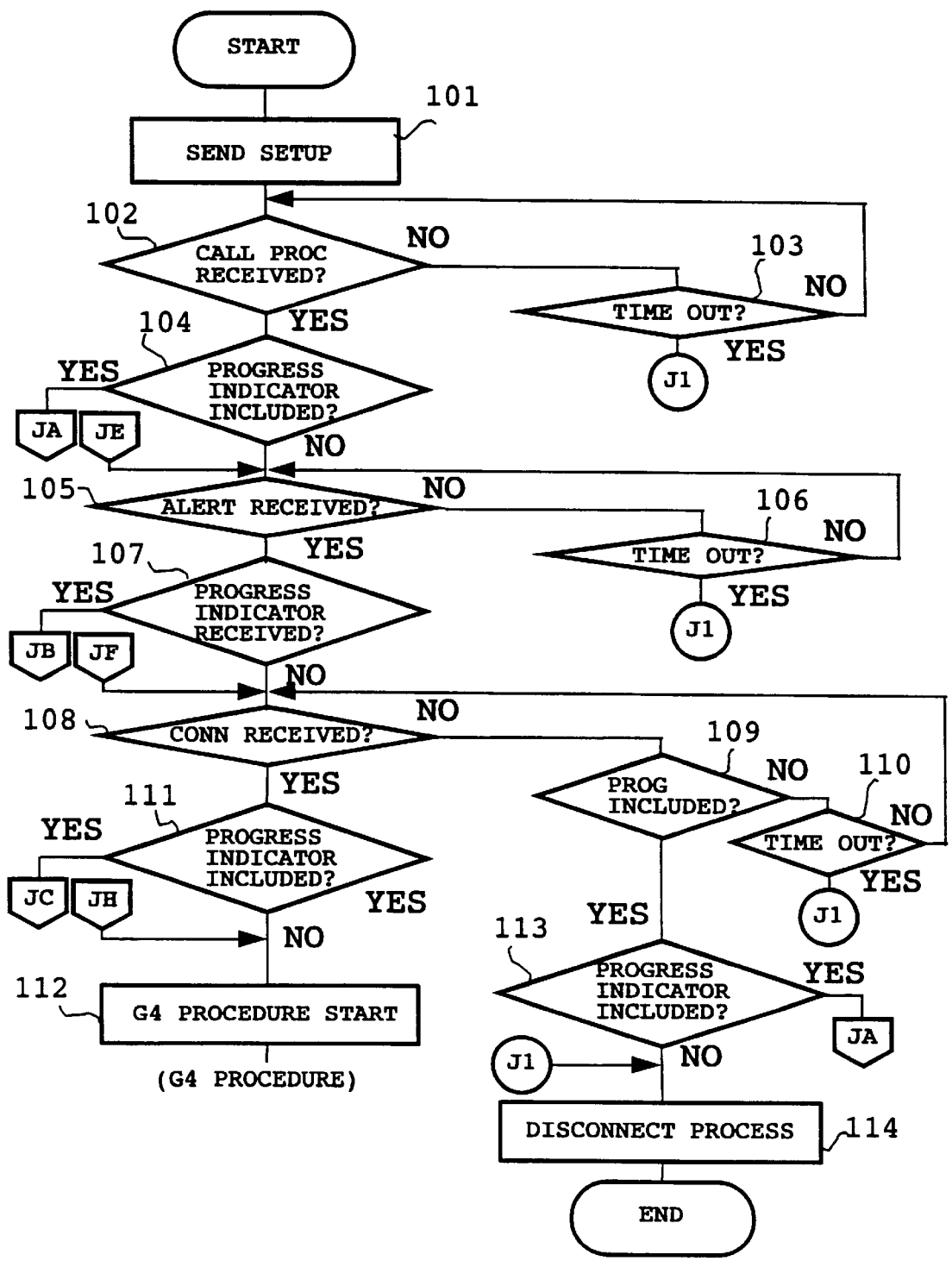
FIG. 6(a) is a flowchart showing a procedure of setting up a call in the case of a group IV (G4) transmission mode.
Figure 6B:
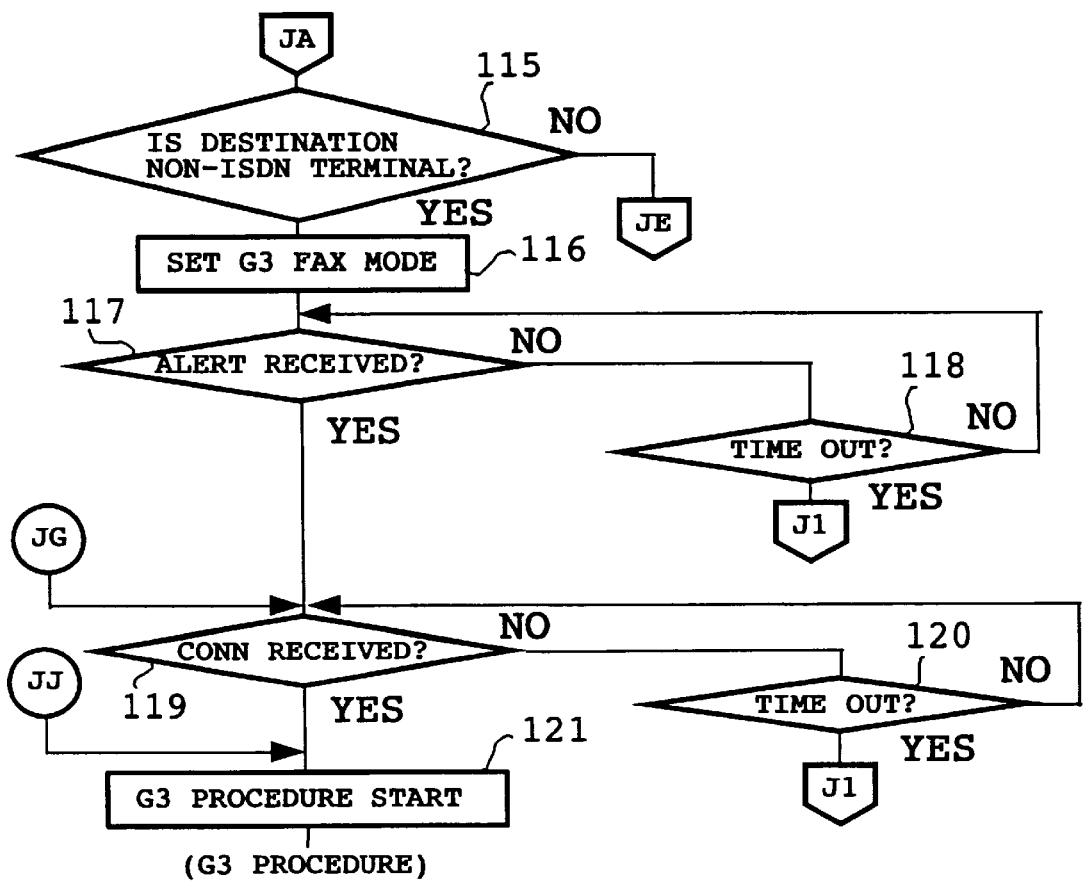
FIGS. 6(b)–6(d) are further flowcharts showing procedures of setting up a call in the case of a group III (G3) transmission mode.

When the judgment of Step 104 becomes YES in a case that the progress indication information element is included in the call proceeding message CALL PROC, the system controller 1 of the calling terminal checks, by Step 115 shown in FIG. 6(b), whether or not the contents of the progress indication information element indicate that the called terminal is a non-ISDN terminal. In a case that the judgment of Step 115 becomes NO, the procedure proceeds to Step 105. On the other hand, in a case that the judgment of Step 115 becomes YES, the system controller 1 of the calling terminal instructs, by Step 116, the switch 15 to switch the connection of the ISDN interface circuit 14 from the G4 procedure communication controller 13 to A/D converter 11 and D/A converter 12, and further instructs the switch 16 to switch the connection of A/D converter 11 and D/A converter 12 from the handset 10 to the modem 9, so that the transmission mode is changed from the speech mode to the G3 facsimile transmission mode.

After executing Step 116, the system controller 1 of the calling terminal checks, by a NO judgment loop of Steps 117 and 118, whether or not the alerting message ALERT is received within a predetermined time period after a completion of a process of Step 116. When the judgment of Step 117 becomes YES, the system controller 1 of the calling terminal checks, by a NO judgment loop of Steps 119 and 120, whether or not the connection message CONN is received within a further predetermined time period since then. In a case that the judgment of Step 119 becomes YES, the system controller 1 of the calling terminal activates, by Step 121, the G3 procedure communication controller 8 so that the G3 facsimile transmission control procedure is initiated.

Figure 6C:
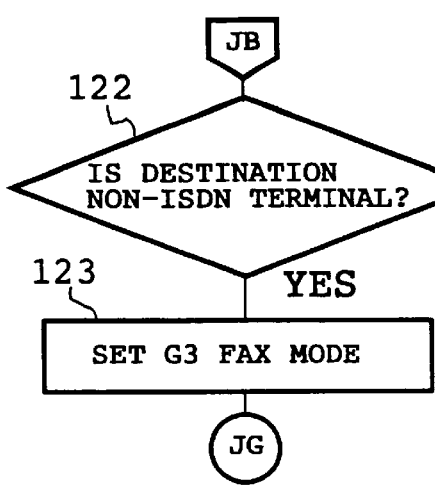

When the judgment of Step 107 becomes YES, the system controller 1 of the calling terminal checks, by Step 122 shown in FIG. 6(c), whether or not the contents of the progress indication information element indicate that the called terminal is a non-ISDN terminal. When the judgment of Step 122 becomes NO, the process proceeds to Step 108. Alternatively, when the judgment of Step 122 becomes YES, the system controller 1 of the calling terminal sets, by Step 123, the facsimile to the G3 facsimile mode in the same way as in Step 116. Thereafter, the procedure proceeds to Step 119 shown in FIG. 6(b).

Figure 6D:
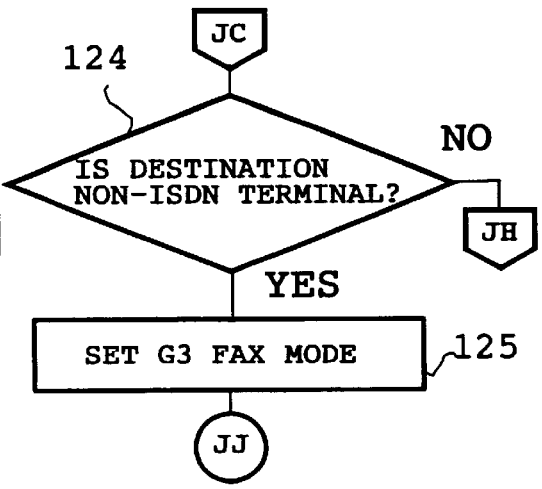

When the judgment of Step 111 becomes YES, the system controller 1 of the calling terminal checks, by Step 124 shown in FIG. 6(d), whether or not the contents of the progress indication information element indicate that the called terminal is a non-ISDN terminal. When the judgment of Step 124 becomes NO, the process proceeds to Step 112. When the judgment of Step 124 becomes YES, the system controller 1 of the calling terminal sets, by Step 125 shown in FIG. 6(d), the facsimile to the G3 facsimile mode as in the same way as in Step 116. Then, the procedure proceeds to Step 121.

During the time when the calling terminal waits for any message, if a time out occurs, i.e., if a message is not received within a predetermined time, and therefore any one of the results in Steps 103, 106, 110, 118, and 120 becomes YES, the system controller 1 of the calling terminal executes the process in Step 114 and stops transmitting the information.

Thus, a calling terminal is switched to the G3 facsimile mode when a progress indication information element is included in the call setup message SETUP sent during a call setup process, and the contents thereof indicate that the called terminal is a non-ISDN terminal. In such an event as described above, the system controller 1 of the calling terminal registers in the abbreviated dialing information, for example, in the parameter memory 2, that the called terminal is a G3 facsimile so that the called terminal is automatically called in a G3 facsimile mode from a next calling operation and afterward. In addition, the system controller 1 of the calling terminal memorizes the date and time of such a registration in the abbreviated dialing information.

Figure 7:
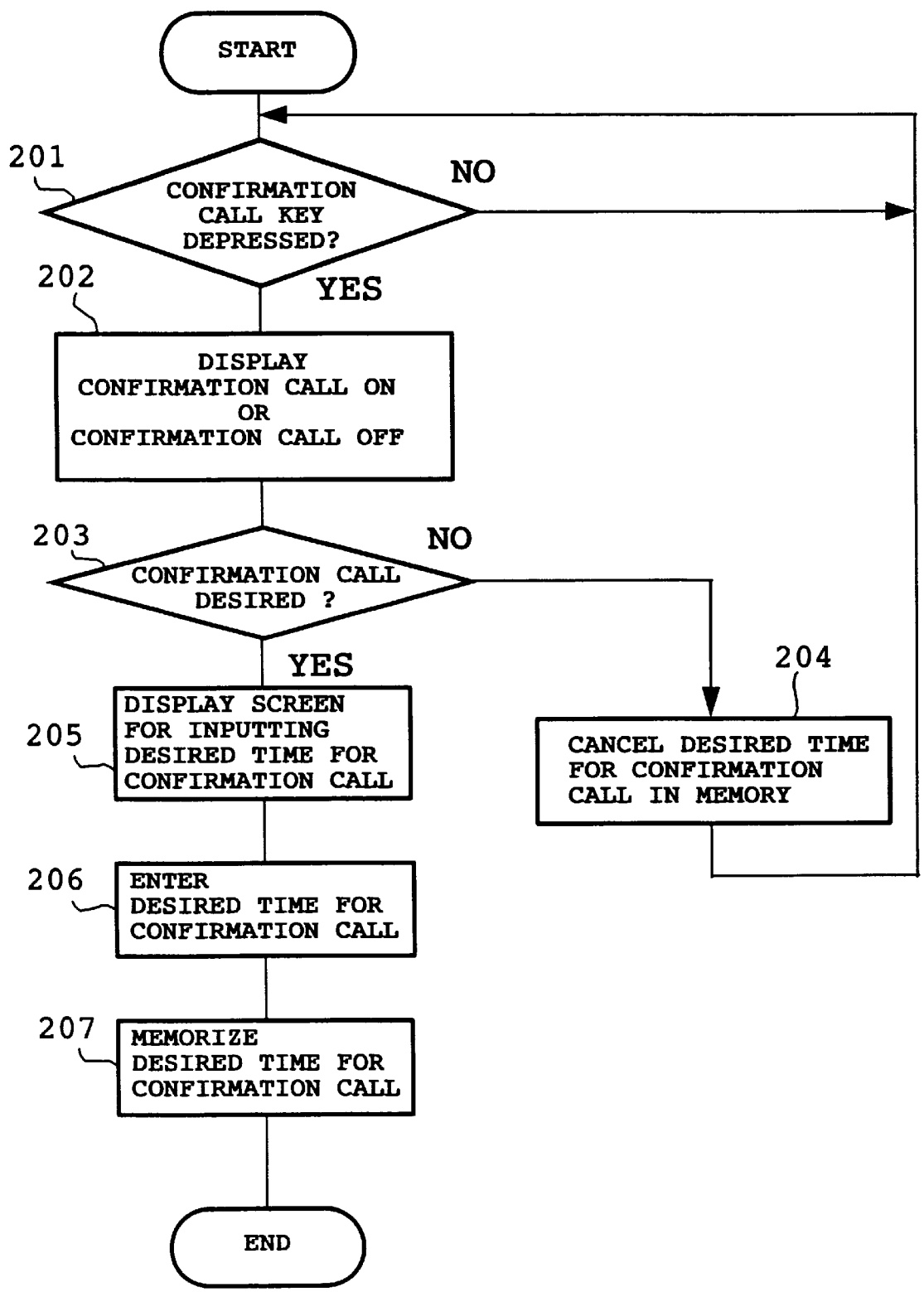
FIG. 7 is a flowchart showing a procedure of setting an arbitrary time period for setting up a confirmation call.

Next, an operation of the confirmation call key 5h of the facsimile of the present invention is explained with respect to FIG. 7. As noted above, as one optional feature in the present invention a confirmation call key 5h can be provided. This operation of the present invention now discussed assumes that such a confirmation call key 5h is provided. This confirmation call key 5h is used to set up an operation in which the system of the present invention registers and executes a confirmation call operation to confirm whether a facsimile machine to be called has been changed or updated to a G4 facsimile.

That is, as discussed above, when a calling facsimile machine operable with a G4 procedure is utilized in the abbreviated dialing mode, the G4 calling facsimile machine sends communication by the procedure stored in the abbreviated dialing mode memory. This gives a rise to a situation in which if a called facsimile machine is registered as being a G3 facsimile machine in the abbreviated dialing mode memory, e.g. parameter memory 2, but has subsequently been changed or updated to a G4 facsimile machine, the calling facsimile machine still executes a G3 procedure, even though it would be possible to execute a G4 procedure. The present invention provides an operation in which a confirmation call is sent to called facsimile machines which are registered in the abbreviated dialing mode memory as being G3 facsimile machines, to determine whether such facsimile machines have been changed or updated to G4 facsimile machines.

As shown in FIG. 7, according to one operation in the present invention, the system controller 1 of the calling terminal checks depression of the confirmation call key 5h by Step 201 which makes an endless No judgment loop until the judgment becomes YES. When an operator desires to set or reset a confirmation call operation, the operator depresses confirmation call key 5h after selecting a called facsimile machine in the abbreviated dialing mode. Upon a detection of depressing the confirmation call key 5h by Step 201, one of the messages "confirmation call on" or "confirmation call off" is displayed on the liquid crystal display (LCD) panel 5g, which is shown in FIG. 2, indicating the status of whether the confirmation call operation is set on or is set off.

When the confirmation call operation is set off as detected in Step 203, i.e., NO in step 203, the system controller 1 of the calling terminal cancels the contents of an arbitrary time period memorized in the parameter memory 2 in step 209, which indicates a time when the confirmation call is to be sent, as discussed in more detail below. After that, the process proceeds to Step 201. When the confirmation call operation is set on as detected in Step 203, i.e., YES in step 203, the system controller 1 allows an operator to set a desired time for the confirmation call to be input in step 204. If the operator desires to set the time for the confirmation call, YES in step 204, the system controller 1 of the calling terminal then arranges, by Step 205, to display a screen for the operator to input numeric data for setting an arbitrary time period for executing the confirmation call on the liquid crystal display (LCD) panel 5g. When the arbitrary time period is input by the operator in Step 206, the system controller 1 of the calling terminal memorizes, by Step 207, the arbitrary time period in the parameter memory 2 shown in FIG. 1.

In this operation of the present invention, an operator can input a time that a confirmation call should be executed. This confirmation call, as discussed further below, causes the calling facsimile machine to call a called facsimile machine which is registered in the abbreviated dialing mode as a G3 facsimile machine to determine if such a called facsimile machine has been changed or updated to a G4 facsimile machine. The time that the operator can input can be any one of a specific date, a specific time period from the time when the confirmation call key 5h is depressed, for example in one month or once every month, or may even indicate to execute the confirmation call after a certain number of transmissions are sent to the called facsimile machine, for example, the confirmation call can be executed after every ten transmissions to the called facsimile machine.

In the operation of the present invention as discussed above, the operator may desire to input the time for executing the confirmation call, YES in Step 204. However, the time for executing the confirmation call can also be set by a default by the system controller 1 if the operator does not desire to set the time for the confirmation call, NO in Step 204, in which case the system then proceeds to Step 208 in which a default time for the confirmation call is memorized in the parameter memory 2. As examples, the default mode can be set to execute a confirmation call once a month or after every 10 transmissions to a specific called facsimile machine.

Figure 8:
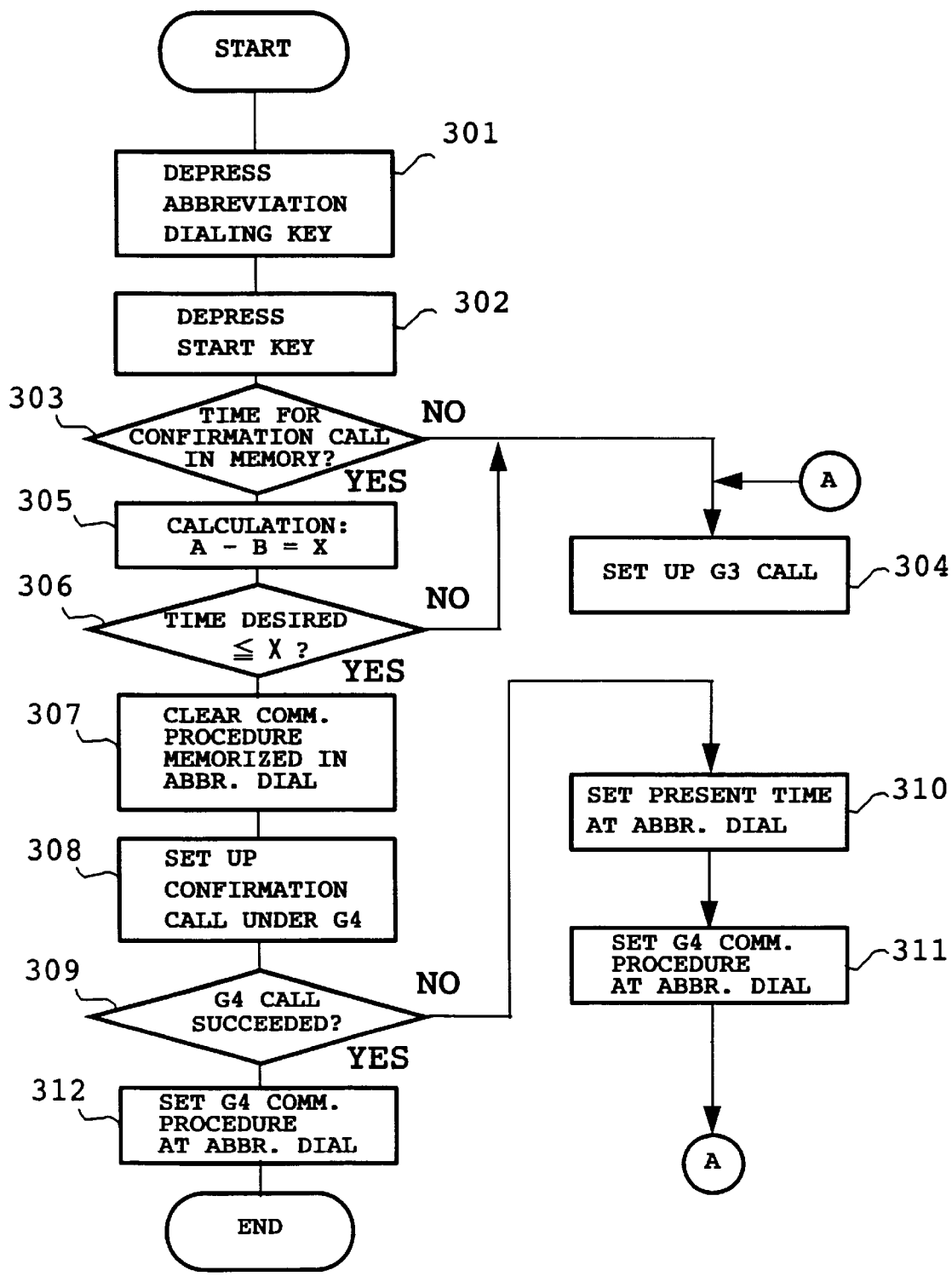
FIG. 8 is a flowchart showing an operation of executing a confirmation call in the present invention.
Figure 9:
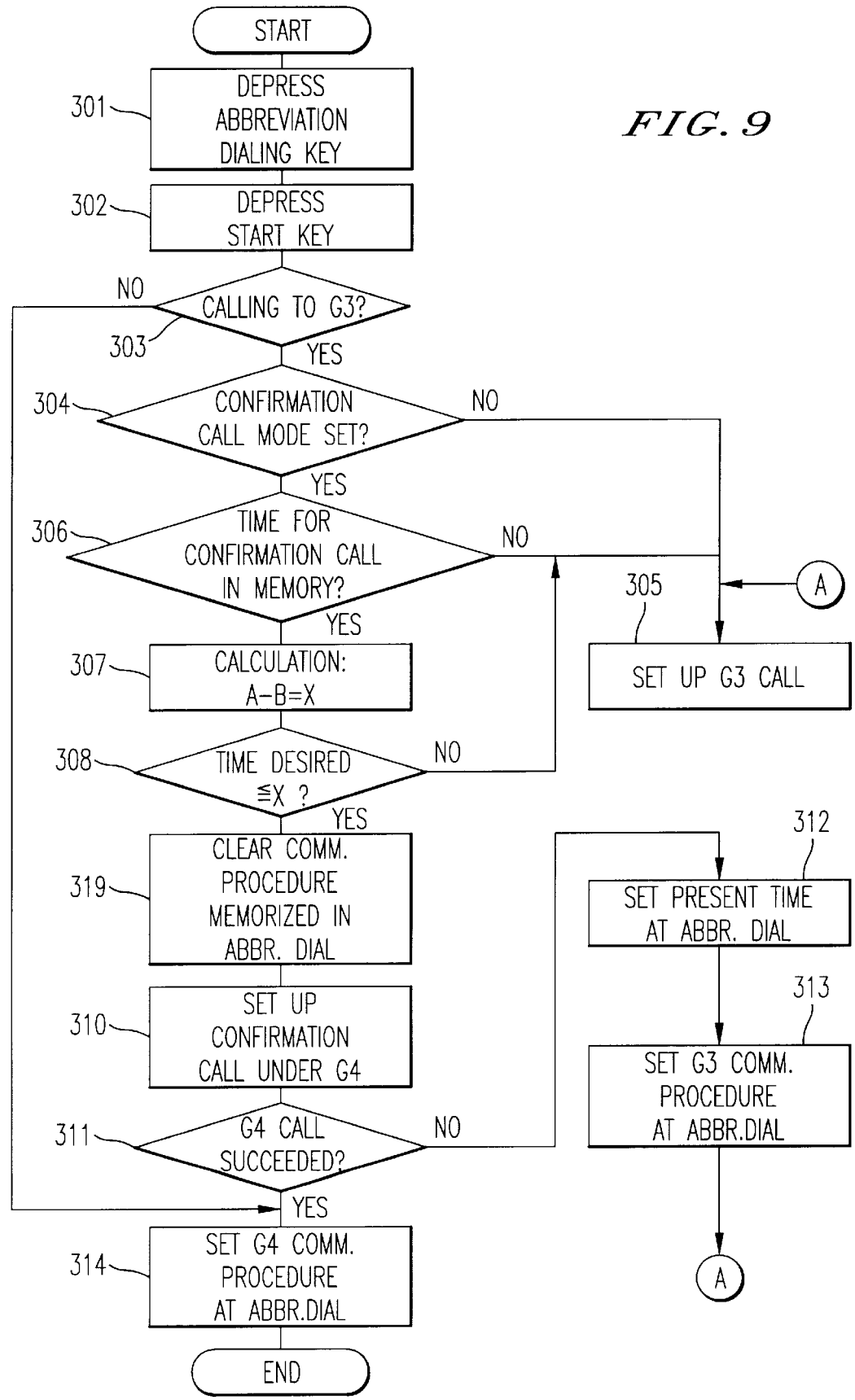
FIG. 9 is a flowchart showing a further operation of executing a confirmation call in the present invention.

Next, an operation of executing the confirmation call in the facsimile of the present invention is explained with respect to FIGS. 8 and 9.

When a calling terminal sets up a call to a different called terminal, the system controller 1 of the calling terminal checks, by Step 301, an input of a registered calling number in the abbreviated dialing mode through the ten-key pad 5c, and, by Step 302, depression of the start key 5a. When detecting the key input in Step 301 and the depression of the start key 5a in Step 302, the system controller 1 of the calling terminal checks, by Step 303, whether or not the above-mentioned called facsimile machine is registered as a G3 facsimile machine in parameter memory 2. When it is determined that the called facsimile machine is not registered as a G3 facsimile machine, NO in Step 303, the system proceeds to Step 314 where a G4 communication procedure registered in the abbreviated dialing mode is executed. If the called facsimile machine is registered as a G3 facsimile machine, YES in Step 303, the system proceeds to Step 304 where it is determined whether the confirmation call mode has been set. As discussed above, the confirmation call mode can be set by either an operator depressing the confirmation call key 5h or by a default mode set by the system, as shown in FIG. 7. As another possibility, the confirmation call mode can be set for a one time confirmation call by the operator depressing the confirmation call key 5h and start key 5a simultaneously, i.e., without requiring the further procedure of setting the time for the confirmation call key.

If the confirmation call mode is not set, NO in Step 304, the system proceeds to Step 305 in which the G3 communication controller 8 sets a call in accordance with the G3 communication control mode registered in the abbreviated dialing mode memorized in parameter memory 2, and the G3 facsimile call is executed.

When the confirmation call mode is set, YES in Step 304, the system proceeds to Step 306 in which it is determined if the time for the confirmation call is stored in parameter memory 2. When a time for the confirmation call is stored in the parameter memory 2, YES in Step 306, the system then proceeds to Step 307. In Step 307 the system controller 1 of the calling terminal executes a calculation of A time minus B time by Step 307. In the calculation, A time is defined as a time when a called terminal has been registered as a terminal having the G3 facsimile transmission mode in the abbreviated dialing mode, and B time is defined as the present time. Further, the value of A minus B (i.e., the value X) is then compared with a time C, which is defined as the arbitrary time period set by the operator or set by default to execute the confirmation call, in Step 308.

That is, Steps 307 and 308 operate to essentially determine whether the time to execute the confirmation call has been reached. If YES in Step 308, it indicates that it is time to execute the confirmation call.

Thus, if YES in step 308, the system controller 1 of the calling terminal instructs the G4 communication controller 13 to set up a confirmation call under the G4 transmission mode, which is one time of a confirmation call, of which procedure is shown in FIGS. 6(a)–6(d). A success of the confirmation call under the G4 facsimile transmission mode is then detected in Step 311. If the G4 transmission is successful, i.e., YES in Step 311, this indicates that the called facsimile machine has been updated or changed to a G4 facsimile machine, and the system controller 1 of the calling terminal updates and memorizes, by Step 314, the called terminal as a G4 facsimile machine in the abbreviated dialing mode. That is, in this operation of the present invention, if the confirmation call is successful, it is then determined that the called facsimile terminal has been updated or changed to a G4 facsimile machine. A future communication with this called facsimile terminal is then executed with a G4 procedure so that the benefits of the G4 procedure can be taken advantage of in the future.

On the other hand, when detecting a failure of the confirmation call under the G4 transmission by a NO in Step 311, the system controller 1 of the calling terminal recognizes that the called terminal is still a G3 facsimile, and memorizes, by Step 312, the present time in the parameter memory 2 as a part of the abbreviated dialing information; that is, the time information for determining when the next confirmation call is to be executed is updated. The system then proceeds to Step 305 to set up the call under the G3 procedure.

In this way, in this operation of the present invention, a calling facsimile terminal can set up a confirmation call to another called facsimile terminal which is registered in an abbreviated dialing mode as being a G3 facsimile machine. The confirmation call is sent under a G4 procedure, so that if the confirmation call is successful, this provides an indication to the calling facsimile machine that the called facsimile machine, which had been registered as a G3 facsimile machine, has now been changed or updated to a G4 facsimile machine. The calling facsimile machine can then store such information so that all future transmissions to the called facsimile machine can take place in the G4 procedure, to take advantage of the benefits of the G4 procedure.

FIG. 9 shows a second embodiment of the present invention which is similar to that of FIG. 8, except that the procedure shown in FIG. 9 includes Steps 319 and 313. In the operation of the present invention set forth in FIG. 9, if it is indicated that it is time for the confirmation call to be executed, YES in Step 308, the communication procedure memorized in the abbreviated dialing mode is erased from parameter memory 2 in step 319; that is, it is erased from the parameter memory 2 that the called facsimile machine is a G3 facsimile machine. Then, the system proceeds to set up the confirmation call under the G4 procedure in Step 310. If the call is not successful, the system must be updated to indicate that the facsimile machine being called is a G3 facsimile machine in Step 313.

This operation of the present invention as set forth in FIG. 9 is similar to that in FIG. 8, except that an automatic clearing of the parameter memory 2 indicating the status of the called facsimile machine is implemented when the confirmation call is executed, as shown in step 319.

An exemplary embodiment of the present invention is explained as above. However, the present invention is not limited to such embodiments since various modifications can be practiced. As an example of such modifications, a way of a periodical call origination can be in every predetermined call origination, every predetermined time period, every specified time and day, or the like.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous additions modifications and variations of the present invention are possible in light of the above teachings. It is therefore to be understood that within the scope of the appended claims, the present invention may be practiced otherwise than as specifically described herein.

What is claimed as new and is desired to be secured by: Letters Patent of the United States is:

1. A terminal apparatus for transmitting and receiving image data, comprising:

memorizing means for memorizing in a memory a number of a called facsimile terminal to be called, and an indication of a facsimile procedure of the called facsimile terminal; and confirmation call means for executing a confirmation call at one of an arbitrary timing set by an operator not based on transmission control for image information transmission and an arbitrary default time not based on transmission control for image information transmission under a group 4 (G4) facsimile procedure to the called facsimile when the memory indicates that the called facsimile machine has a group 3 (G3) facsimile procedure.

2. The terminal apparatus according to claim 1, wherein the confirmation call means includes an input means for allowing an operator to input the arbitrary timing to execute the confirmation call.

3. A method for controlling a terminal apparatus for transmitting and receiving image data, comprising the steps of:

memorizing a number of the called facsimile terminal to be called, and an indication of a facsimile procedure of the called facsimile terminal; and executing a confirmation call at one of an arbitrary timing set by an operator not based on transmission control for image information transmission and an arbitrary default time not based on transmission control for image information transmission under a group 4 (G4) facsimile procedure to the called facsimile when the memory indicates that the called facsimile machine has a group 3 (G3) facsimile procedure.

4. The method for controlling a terminal apparatus according to claim 3, further comprising the step of allowing an operator to input the arbitrary timing to execute the confirmation call.

5. A terminal apparatus for transmitting and receiving image data coupled, through a single communication line, to an integrated services digital network (ISDN), comprising:

ISDN interface means, coupled to said ISDN, for executing a transmission control procedure conforming to an ISDN structured architecture;

first control means for executing a first communication control suitable for exchanging data with a first called terminal coupled to said ISDN for transmitting and receiving image data through said ISDN;

second control means for executing a second communication control suitable for exchanging data with a second called terminal coupled to an analog telephone line network for transmitting and receiving image data through said ISDN and an analog telephone line network;

converting means for converting a plurality of analog signals into digital data suitable for transmitting through said ISDN, a plurality of said analog signals comprising an input signal from said ISDN to said second control means;

switching means for selectively switching between said first control means and second control means to be coupled to said ISDN interface means;

memorizing means for memorizing at least one calling number and an identification of one of said first called terminal coupled to said ISDN and said second called terminal coupled to said analog telephone line network, said identification identifying a transmitting procedure of the called terminal, said memorizing means memorizing a time when said identification is memorized; and confirmation call means for executing a confirmation call at one of an arbitrary timing set by an operator not based on transmission control for image information transmission and an arbitrary default time not based on transmission control for image information transmission under a group 4 (G4) facsimile procedure, only when an identification corresponding to said called terminal identifies that the called terminal is a group 3 (G3) facsimile procedure terminal.

6. The terminal apparatus according to claim 5, further comprising:

inputting means for inputting, correspondingly to each calling number, the arbitrary timing to execute the confirmation call, said time being memorized in said memorizing means.

7. The terminal apparatus for transmitting and receiving image data according to claim 5, wherein said transmission control procedure executed by said ISDN interface means conforms to a physical layer, a data-link layer, and a network layer of said ISDN structured architecture for a group 4 facsimile machine as prescribed by CCITT recommendations.

8. The terminal apparatus for transmitting and receiving image data according to claim 5, wherein said first communication control conforms to a transport layer, a session layer, a presentation layer and an application layer of said ISDN structured architecture for a group 4 facsimile machine as prescribed by CCITT recommendations.

9. The terminal apparatus for transmitting and receiving image data according to claim 5, wherein said first communication control conforms to a group 4 facsimile procedure as prescribed by CCITT recommendations.

10. The terminal apparatus for transmitting and receiving image data according to claim 5, wherein said second communication control conforms to a group 3 facsimile procedure as prescribed by CCITT recommendations.

11. The terminal apparatus for transmitting and receiving image data according to claim 5, wherein said memorizing means changes said identification that said called terminal is coupled to said ISDN when said confirmation call, which is executed by said confirmation call setting up means, is successful.

12. The terminal apparatus for transmitting and receiving image data according to claim 5, wherein said switching means selects said second control means at a time when said called terminal is a G3 facsimile procedure terminal.

13. A method for controlling a terminal apparatus for transmitting and receiving image data coupled to an integrated services digital network (ISDN) through a single communication line, comprising the steps of:

executing a first communication control for exchanging data with a first called terminal coupled to said ISDN for transmitting and receiving image data through said ISDN;

executing a second communication control suitable for exchanging data with a second called terminal coupled to an analog telephone line network for transmitting and receiving image data through said ISDN and an analog telephone network;

memorizing at least one calling number and an identification of one of said first called terminal coupled to said ISDN and said second called terminal coupled to said analog telephone line network, and a time when said identification is memorized, said identification identifying a transmitting procedure of the called terminal and;

executing a confirmation call at one of an arbitrary timing set by an operator not based on transmission control for image information transmission and an arbitrary default time not based on transmission control for image information transmission under a group 4 (G4) facsimile procedure only when an identification corresponding to said called terminal identifies that the called terminal is a group 3 (G3) facsimile procedure to terminal.

14. The method for controlling a terminal apparatus according to claim 13, further comprising the step of:

inputting, correspondingly to each calling number, the arbitrary timing to execute the confirmation call, said time period being memorized in said memorizing step.

15. The method for controlling a terminal apparatus according to claim 13, wherein said step of executing a first communication control conforms to a transport layer, a session layer, a presentation layer and an application layer of said ISDN structured architecture for a group 4 facsimile machine as prescribed by CCITT recommendations.

16. The method for controlling a terminal apparatus according to claim 13, wherein said step of executing a first communication control conforms to a group 4 facsimile procedure as prescribed by CCITT recommendations.

17. The method for controlling a terminal apparatus according to claim 13, wherein said step of executing a second communication control conforms to a group 3 facsimile procedure as prescribed by CCITT recommendations.

18. The method for controlling a terminal apparatus according to claim 13, wherein said step of memorizing said calling number and said identification changes said identification that said called terminal is coupled to said ISDN when said confirmation call, which is executed in said step of setting up a confirmation call, is successful.

* * * * *

UNITED STATES PATENT AND TRADEMARK OFFICE
CERTIFICATE OF CORRECTION

PATENT NO. : 6,067,172
DATED : MAY 23, 2000
INVENTOR(S): Koji Yokoyama

It is certified that an error appears in the above-identified patent and that said Letters Patent is hereby corrected as shown below:

In column 6, line 31, change "date" to --data--.
In column 9, line 47, change "massage" to --message--.

Signed and Sealed this

Twenty-second Day of May, 2001

Attest:

NICHOLAS P. GODICI

*Attesting Officer*  Acting Director of the United States Patent and Trademark Office